US009241598B2

(12) United States Patent
Rouyer et al.

(10) Patent No.: US 9,241,598 B2
(45) Date of Patent: Jan. 26, 2016

(54) ACCESSORIES FOR CHOPPING FOODSTUFFS, HAVING IMPROVED DISCHARGING, AND ELECTRICAL HOUSEHOLD APPLIANCE COMPRISING SUCH ACCESSORIES

(75) Inventors: Philippe Rouyer, Juillan (FR); Nicolas Suberbie, Juillan (FR); Jean-Marie Lafond, Ibos (FR)

(73) Assignee: SEB S.A., Ecully (FR)

( * ) Notice: Subject to any disclaimer, the term of this patent is extended or adjusted under 35 U.S.C. 154(b) by 361 days.

(21) Appl. No.: 13/814,292

(22) PCT Filed: Jul. 13, 2011

(86) PCT No.: PCT/FR2011/051685
§ 371 (c)(1),
(2), (4) Date: Apr. 22, 2013

(87) PCT Pub. No.: WO2012/017153
PCT Pub. Date: Feb. 9, 2012

(65) Prior Publication Data
US 2013/0206886 A1 Aug. 15, 2013

(30) Foreign Application Priority Data
Aug. 6, 2010 (FR) ...................................... 10 56481

(51) Int. Cl.
*A47J 43/25* (2006.01)
*A47J 43/07* (2006.01)

(52) U.S. Cl.
CPC *A47J 43/25* (2013.01); *A47J 43/07* (2013.01); *A47J 43/255* (2013.01)

(58) Field of Classification Search
CPC .................................. A47J 43/25; A47J 43/07
USPC ........................................................... 241/93
See application file for complete search history.

(56) References Cited

U.S. PATENT DOCUMENTS 1,527,087 A 2/1925 Schulman
2005/0204936 A1 9/2005 Rosa

FOREIGN PATENT DOCUMENTS

FR 2897522 A1 8/2007
WO 2004012915 A1 2/2004

*Primary Examiner* — Mark Rosenbaum
(74) *Attorney, Agent, or Firm* — The Webb Law Firm

(57) ABSTRACT

Provided is a static food cutting element including a hollow body having an inlet opening in which are arranged food cutting means, and also a discharge outlet. It includes a through-window formed in a lower part of the hollow body, and at least one lengthwise edge of the through-window forms a unit for guiding the cut foods towards the discharge outlet. Also provided is a cutting tool including such a static cutting element and also to an electric appliance including such a cutting tool.

18 Claims, 3 Drawing Sheets

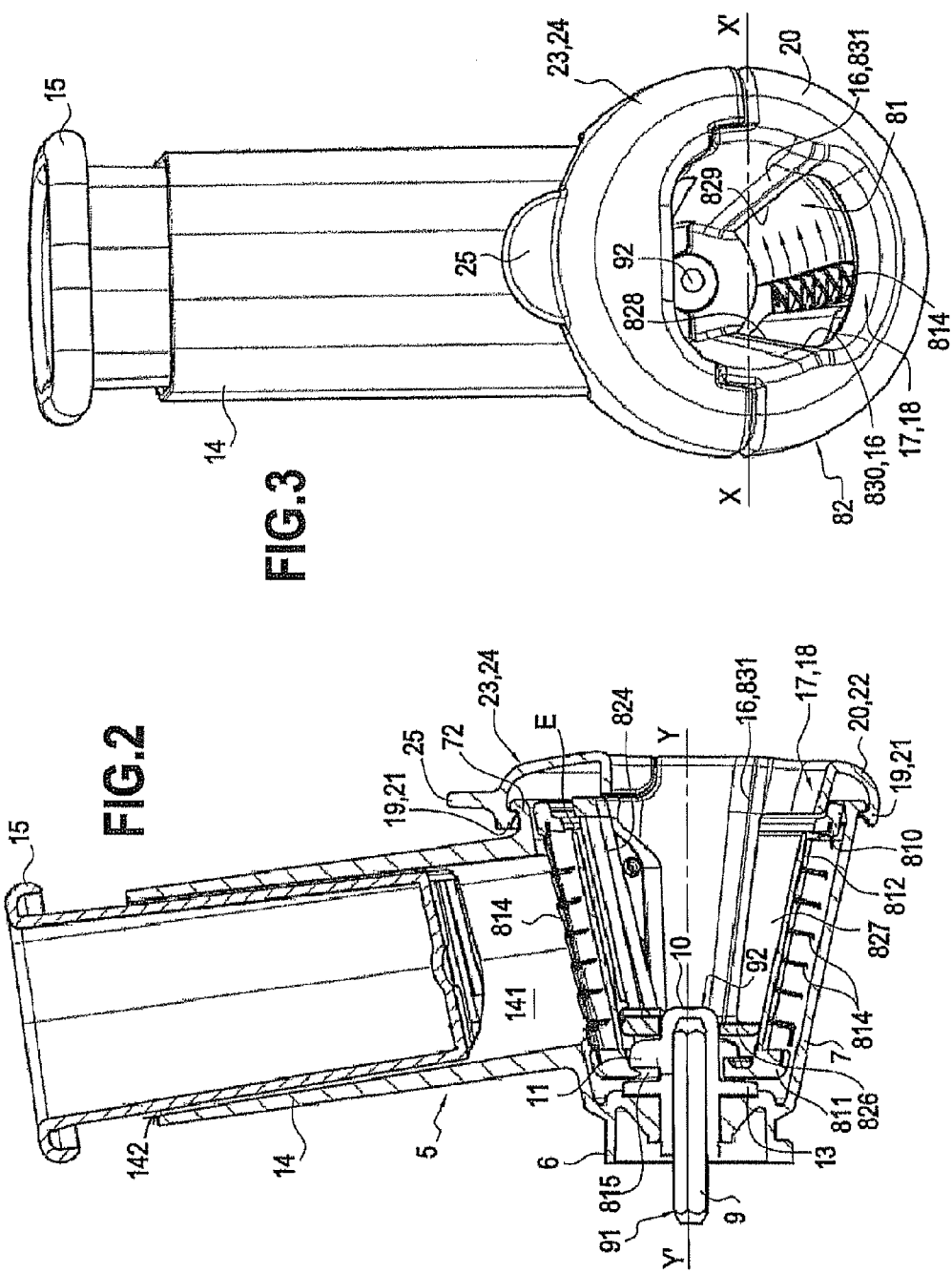

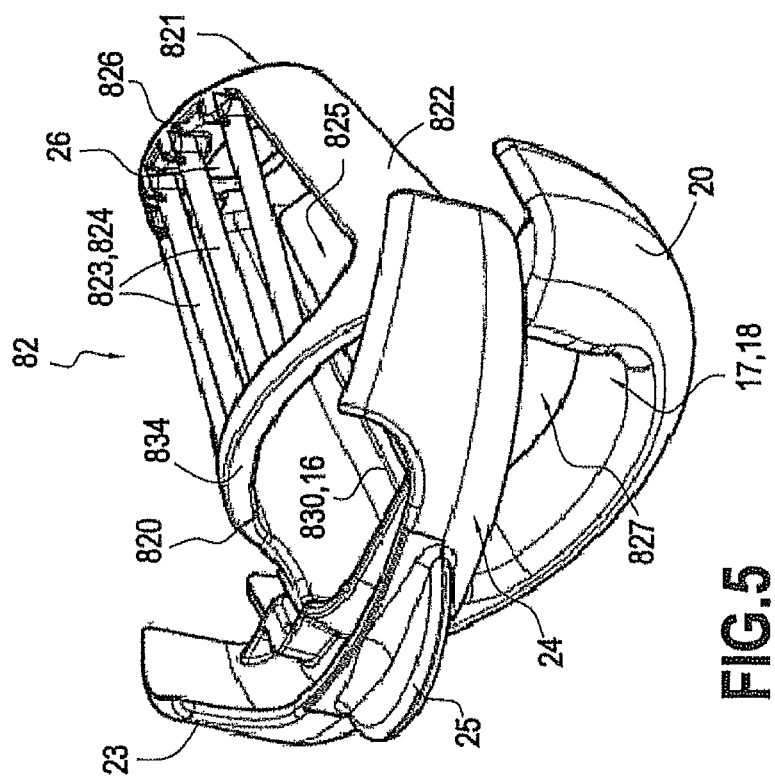
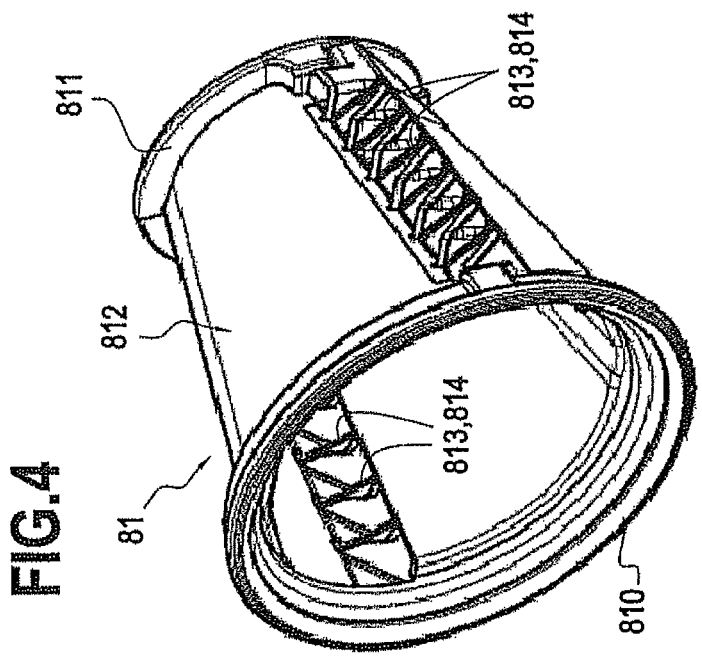

ACCESSORIES FOR CHOPPING FOODSTUFFS, HAVING IMPROVED DISCHARGING, AND ELECTRICAL HOUSEHOLD APPLIANCE COMPRISING SUCH ACCESSORIES

FIELD OF THE INVENTION

The present invention relates to the field of food processing and more particularly to the field of cutting foods into pieces.

In this context, the invention proposes novel food cutting accessories for an electrical appliance and an electrical appliance including such accessories.

In this invention's field, various appliances for grating and/or chopping foods have been known for a long time. These appliances, which can be hand-powered and/or motorized, include as standard features one or more cylindrical or truncated cone-shaped rotary working tools including on their surface cutting means which, when rotationally driven in contact with the foods, enable said foods to be cut into pieces.

The invention more particularly relates to rotary tools and appliances for dicing foods in which the cut foods can be served directly from the discharge outlet of the tool or appliance.

DESCRIPTION OF RELATED ART

An example of a food-dicing appliance is described in document U.S. Pat. No. 1,527,087. This appliance consists of a rotary cutting drum activated by a hand crank. The rotational axis of the drum is mounted on a stirrup of which a helical tab projects inside the drum for scraping and ejecting the diced foods that fall through cutting holes formed in the cylindrical wall of the drum inside it.

A disadvantage of the appliance described in U.S. Pat. No. 1,527,087 resides in the manual nature of the drum drive. Another disadvantage resides in the danger that using this appliance poses to the user, who needs to press the foods directly against the cutting surface of the drum in order to cut them.

Another example of a food-dicing appliance is described in document WO 2004/012915 A1. This appliance includes a base enclosing a motor activating a rotary drive train for a cutting tool mounted in the magazine of a working attachment integrally formed with the base. The cutting tool is composed of two cutting elements coaxially mounted relative to one another in the magazine of the working attachment. These two elements each include food cutting blades; a first cutting element is mobile, rotationally driven by the drive train and the motor around a second, stationary element for a first cutting of the food into elongated bars; the second cutting element is stationary in relation to the magazine of the working attachment and to the first cutting element and its blade or blades, enabling the dicing of the bars cut by the first cutting element. The foods to be cut are pushed with the help of a pusher against the first cutting element in a supply tube. The diced foods are discharged from the interior of the second cutting element by sliding along a slanted wall of the latter.

A disadvantage of the appliance described in this document resides in the inefficiency of the slant for discharging the cut foods out of the cutting tool, which leads to the tool clogging and to the cut foods being crushed. Indeed, the cut foods tend to stick to the inside surface of the cutting tool rather than to slide along said surface, and in fact it is only through the accumulation of the foods in the tool that the latter are gradually pushed out. This solution is unsatisfactory.

Hence an object of the present invention is to provide a food-dicing element that enables a rapid and complete discharge of cut foods from the cutting tool.

Another object of the invention consists in providing an element for dicing foods or cutting them into pseudo-sticks that is simple, efficiently achieved, and easy to clean.

A third object of the invention consists in likewise obtaining a cutting element that can be adapted as needed to existing cutting or slicing tools or elements for dicing foods or cutting them into pseudo-sticks.

SUMMARY OF THE INVENTION

These different objects are achieved according to the invention by means of a static food cutting element configured to be inserted and secured in a stationary position inside a rotary food cutting element including first food cutting means and arranged in a mounting magazine of a cutting tool of an electric food processing appliance, said static cutting element including a hollow body having an inlet opening in which are arranged second food cutting means, and also a discharge outlet. According to the invention, this static cutting element includes a through-window formed in a lower part of the hollow body and at least one lengthwise edge of the through-window forms a unit for guiding the cut food towards the discharge outlet.

Therefore, when the cut foods drop into the interior of the static cutting element, they drop down to the open through-window in the wall of the static cutting element opposite the cutting means and are conveyed, by the drive effect exerted by the rotary cutting element of the mobile cutting tool, into the through-window against said lengthwise edge of the window which, by virtue of its shape, guides the foods towards the discharge outlet of said static cutting element and of the cutting tool.

With the static cutting element of the invention, any clogging as the food is being cut up is avoided since the cut elements, which fall into the interior of the static cutting element after passing through the cutting means of the latter, end up on a mobile surface, namely the inner surface of a cutting element rotationally mounted in the through-window formed in the wall of the static cutting element. In this manner, the foods are driven against a guiding surface provided on the edge of the through-window, this guiding surface acting as an ejector towards the outlet of the cutting tool of the equipped electric appliance. Any jamming of the cut foods in the cutting tool of an electric food processing appliance is thus avoided.

Advantageously, the guiding unit is composed of a convex, rounded surface connecting one of the lengthwise edges of said through-window to the inner surface of the hollow body. Thus each lengthwise edge of the window forms, in a manner of speaking, a track for guiding the cut foods towards the discharge outlet of the static cutting element, which is also the outlet of the cutting tool thus implemented.

According to a preferred embodiment, the through-window is arranged, at least partially, opposite the inlet opening.

Advantageously according to the invention, the second cutting means include a set of blades extending longitudinally through the inlet opening towards the discharge outlet.

Advantageously according to the invention, the static cutting element thus provided includes, in the vicinity of the discharge outlet, a peripheral edge comprising an assembly for discharging the cut foods in the longitudinal extension of the through-window.

Also in an advantageous manner, the static cutting element of the invention includes, in the vicinity of the discharge outlet, a peripheral edge comprising at least one hooking means.

According to a preferred embodiment, said peripheral edge forms a rim, and at least one said hooking means includes a lock formed by a section of the rim, said section being pivotable in relation to the rest of the rim along an axis (X-X') and including at least one linking means.

Advantageously according to the invention, the at least one hooking means previously mentioned is advantageously elastically deformable and/or can even snap-in.

According to a second object, the present invention likewise relates to a food cutting tool including:

a) a rotary cutting element having:
   a first open end,
   a second end opposite the first open end and equipped with means for coupling to a rotary drive mechanism, and
   a revolving wall joining the two ends and including first food cutting means;

b) a static cutting element configured to be inserted and secured in a stationary position inside the rotary cutting element when the latter is moved in rotation by said drive mechanism, said static cutting element being configured according to the invention and as previously described.

Advantageously according to the invention, the guiding unit of the static cutting element is composed of a surface that is raised in relation to the inner surface of the revolving wall of the rotary cutting element.

Advantageously according to the invention, the first cutting means include at least one slicing unit provided for cutting at least one piece of food, such as a slice.

Preference is given to the first cutting means including at least one set of blades substantially perpendicular to the lines of the revolving wall of the rotary cutting element.

In one embodiment, the size of the through-window is greater than the size of the food cut by the first cutting means and the second cutting means.

Lastly, a final object of the invention relates to an electric food processing appliance including:

a drive base formed from a housing enclosing an electric drive motor and electrical control means for said motor,
   a working attachment integrally formed with the drive base and including a mounting magazine for a cutting tool,
   a food cutting tool according to the invention, including a rotary cutting element and a static cutting element,
   means for coupling and driving the rotary cutting element of the cutting tool, by means of the electric motor, in rotation in relation to the static cutting element of the cutting tool in the magazine.

According to a characteristic of this electrical appliance, the means for coupling and rotational driving include a drive axis designed to cooperate, by means of a first end, with the electric motor enclosed in the housing of the drive base and bearing, on a second end, a male unit adapted for meshing with a female drive aperture formed in the second end of the rotary cutting element.

Lastly, in an embodiment of the electrical appliance unique to the invention, the magazine of the working attachment has an open end via which the cutting tool is inserted into the working attachment, said open end including a circular peripheral flange forming a shoulder for hooking the hooking means of the static cutting element.

BRIEF DESCRIPTION OF THE DRAWINGS

Numerous other characteristics will emerge from the following description, which refers to the appended drawings showing, as non-limiting examples, embodiments of the object of the invention.

In the appended figures:

FIG. 2 is a longitudinal cross-section of a working attachment receiving a food cutting tool according to the invention mounted on this working attachment, FIG. 3 is a frontal perspective view of a preferred embodiment of the invention's food cutting tool, mounted on a working attachment as in FIG. 2, FIG. 4 shows a first constituent cutting element of the invention's food cutting tool, and FIG. 5 shows a second constituent cutting element of the invention's food cutting tool in cooperation with the first cutting element of FIG. 4.

DETAILED DESCRIPTION OF THE INVENTION

Figure 1:
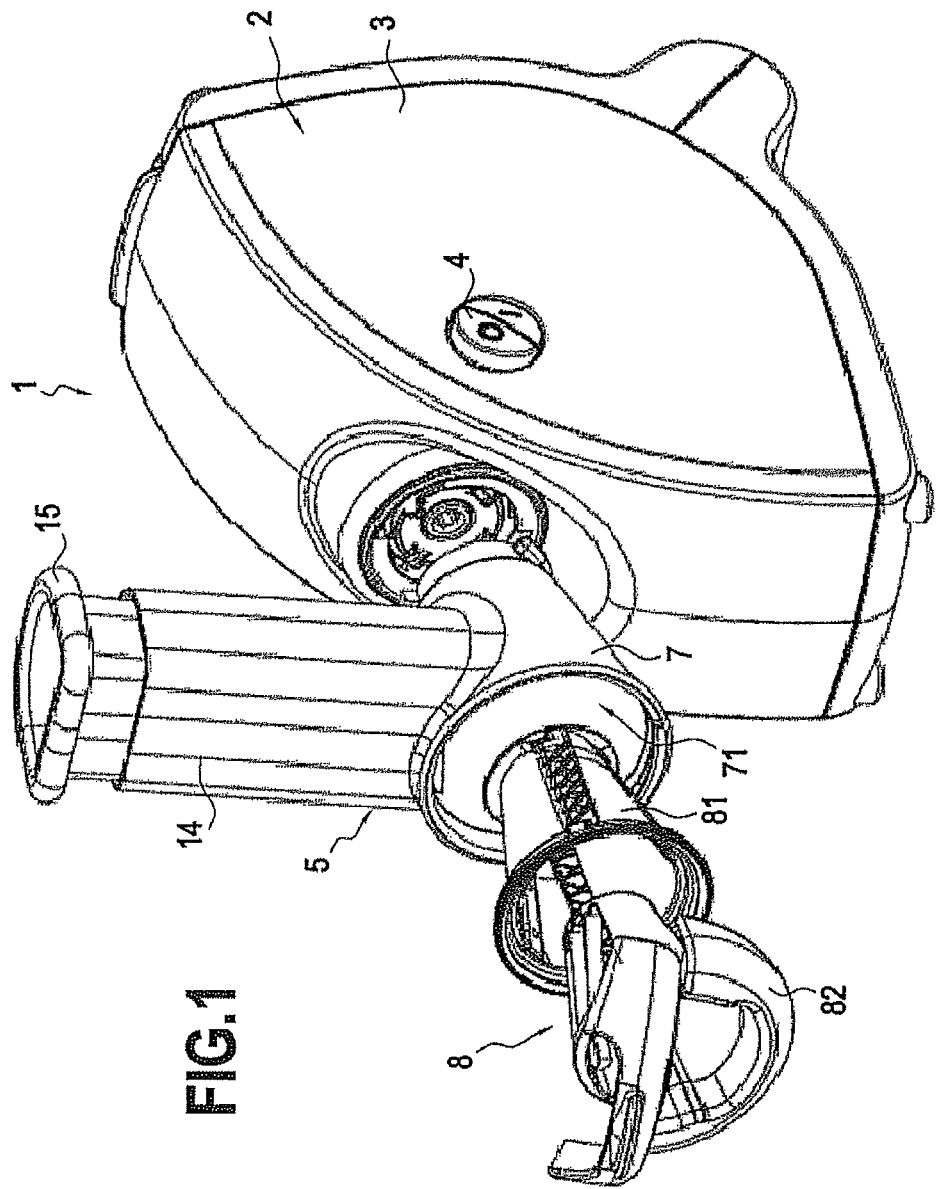
FIG. 1 is an exploded and perspective view of an electrical food processing appliance equipped with a working attachment receiving a food cutting tool according to the invention.

The present invention proposes a static element for dicing foods or cutting them into pseudo-sticks for an electric appliance and a food cutting tool including such a static cutting element enabling improved discharge, without clogging, of the cut foods. The invention likewise proposes an electric appliance adapted for receiving and using such a food cutting tool.

As can be discerned in FIG. 1, the electrical appliance 1 of the invention is formed from a drive base 2 comprising a housing 3 enclosing an electric motor and electronic control circuits for the motor (not shown) connected to control units such as switches 4 located on the housing 3 for enabling a user to turn the appliance 1 on and off.

On the housing 3 is fastened a working attachment 5, illustrated in detail in FIGS. 2 and 3, which is preferably detachable from the housing 3 and designed to be fastened onto the latter by means of a fastening ring 6, in particular a fastening ring with a screw or bayonet coupling. The working attachment 5 includes a magazine 7 delimiting an inner housing 71 suitably dimensioned and configured for receiving and allowing the installation of a food dicing tool 8 having a truncated cone-like shape in the example shown, likewise according to the present invention and described in more detail below.

The working attachment 5 likewise includes a funnel 14 for introducing the foods to be cut. The funnel 14 is integrally formed with the magazine 7. The funnel 14 is formed by a substantially tubular section open at both of its ends which form, respectively, a well 141 communicating with the inside of the magazine 7 and an aperture 142 for introducing the foods to be cut into the funnel 14. This funnel receives a pusher 15 designed for pushing the foods to be cut into the funnel 14 from the insertion aperture 142 towards the well 141 for enabling the cutting of the foods by the cutting tool 8 driven in rotation by a drive axis 9 and the electric motor inside the drive base 2 of the appliance 1 when the user activates the control switch 4.

As can be discerned in FIGS. 1 through 5, the cutting tool 8 consists of a first rotary cutting element 81 and a second static cutting element 82, the latter being the principal object of the invention. These two cutting elements 81, 82 are each truncated cone-shaped, the rotary cutting element 81 being adapted to be inserted into the inner housing 71 of the magazine 7 of the working attachment 5, the static cutting element 82 being adapted to be inserted coaxially into the rotary cutting element 81 as schematically illustrated in FIGS. 1 and 2.

Alternatively, the rotary and/or static cutting elements 81, 82 can also be cylinder-shaped without modifying or changing their functionality or that of the cutting tool 8.

The rotary cutting element 81 is illustrated in FIG. 4. The latter has a first, circular open end 810 located anteriorly and a likewise circular but closed second end 811 located posteriorly in relation to the rotary cutting element 81. The two ends 810, 811 of the rotary cutting element 81 are parallel and concentric to one another and adjoined by a truncated cone-shaped revolving wall 812. The first open end 810 of the rotary cutting element 81 is larger in diameter than the second closed end 811.

The rotary cutting element 81 furthermore includes, in its revolving wall 812, first cutting means 813 consisting of at least one slicing unit provided for cutting a piece or slice of food, said slicing unit including at least one and preferably at least two sets of cutting blades 814 oriented substantially perpendicular to the lines of the revolving wall 812 of the rotary cutting element 81 for cutting food into bars during the rotation of said rotary cutting element 81 about an axis passing through the centre of each of its circular ends 810, 811. Preference is given to the two sets of blades 814 being located in diametrically opposed positions of the revolving wall 812. Further preference is given to the cutting blades being made from metal sheets mounted in open rectangular windows in the revolving wall 812.

The rotary cutting element 81 is advantageously made of plastic material moulded onto the cutting means 813. Alternatively, the cutting tool 8 could in particular be made of stamped metal.

The rotary cutting element 81 of the cutting tool 8 is designed, in a standard manner which can be discerned in FIGS. 1 and 2, to be mounted so that it can rotate freely in the magazine 7 of the working attachment 5 of an electrical food processing appliance 1 for being rotationally driven during the operation of the electrical appliance 1 by the motor of the latter by means of the drive axis 9, illustrated in FIG. 2. This drive axis 9 is mounted in a freely rotatable manner in the fastening ring 6 of the working attachment 5, on the posterior end of the magazine 7. The drive axis 9 cooperates via a posterior end 91 with the electric motor located in the drive base 2 and via an anterior end 92 with the cutting tool 8, and more particularly with the rotary cutting element 81 via its second end 811. The coupling of the drive axis 9 with the rotary cutting element 81 is advantageously achieved by means of a male coupling unit 10 bearing teeth 11 adapted for meshing with a female coupling aperture 815 corresponding to the male coupling unit 10 arranged in the second, closed end 811 of the first cutting element.

The relative coaxiality and positioning of the drive axis 9 in relation to the magazine 7 and to the cutting tool 8 are ensured by a lock washer 13 threaded onto the axis 9 by its posterior end 91 and coming into abutment against the bottom of the magazine 7 receiving the cutting tool 8.

The static cutting element 82 according to the present invention is shown separately in FIG. 5 and in an operating position in FIGS. 2 and 3 in a non-limiting, preferred embodiment.

This static cutting element 82 has a first, open end forming a food discharge outlet 820 located anteriorly, and a second, circular and closed end 821 located posteriorly on said static cutting element 82. The ends 820, 821 of the static cutting element 82 are parallel and concentric to one another and adjoined by a revolving wall defining a hollow body 822 with a truncated cone shape. The discharge outlet 820 is larger in diameter than the second, closed end 821. Furthermore, the dimensions of the static cutting element 82 were selected so as to allow, as can be discerned in FIGS. 1 through 3, the coaxial insertion of the static cutting element 82 into the rotary cutting element 81 for forming the cutting tool 8 inside the magazine 7 of a working attachment 5 of an electrical appliance 1 such as the one shown in FIG. 1. The dimensions of the static cutting element 82 were furthermore selected so as to allow the formation of a space E between the outer surface of the hollow body 822 of the static cutting element 82 and the inner surface of the revolving wall 812 of the rotary cutting element 81 when the static cutting element 82 is inserted into the rotary cutting element 81.

Additionally, the static cutting element 82 includes, in its hollow body 822, cutting means 823 consisting of a set of cutting blades 824 oriented substantially parallel to the lines of the revolving wall of the hollow body 822 for dicing the foods previously cut into bars by the rotary cutting element 81 during the rotation of the latter around the static cutting element 82, which is designed to remain stationary in the magazine 7 of the working attachment 5, as shall be described in the following.

The cutting blades 824 are preferably formed by metal sheets mounted in a substantially trapezoidal or rectangular inlet opening 825 formed in the hollow body 822 and fastened by the embedding of their ends to a front flange of the discharge outlet 820 of the static cutting element 82 and to a bottom wall 826 forming the second, closed end 821 of the cutting element 82.

The static cutting element 82 likewise includes, in the revolving wall of the hollow body 822, a through-window 827 located exactly opposite and having substantially the same shape and dimensions as the inlet opening 825 including the cutting blades 824 of the static cutting element 82.

The static cutting element 82 of the cutting tool 8 is advantageously made of plastic material moulded onto the cutting means 824.

Characteristically, the static cutting element 82 advantageously includes at least one unit 16 for guiding the foods diced by the blades 824 towards the discharge outlet 820, which forms an opening for discharging and serving the cut foods. Advantageously according to the invention, the unit for guiding 16 the cut foods is formed by at least one lengthwise edge 828 of the through-window 827.

Preference is given to each lengthwise edge 828, 829 of the window 827 constituting such a unit 16 for guiding the cut foods. The lengthwise edges 828, 829 of the window 827 each form, on each lengthwise side of said window, a convex rounded surface 830, 831 which is raised in relation to the inner surface 832 of the wall of the hollow body 822 of the static cutting element 82.

According to alternative embodiments not illustrated here, the raised surfaces 830, 831 can also be straight sloping surfaces.

According to another characteristic of the invention, the static cutting element 82 likewise includes, in the vicinity of its inlet opening 820 open on a peripheral edge 834, an assembly 17 for discharging the cut foods in the longitudinal extension of the through-window 827. This discharging assembly 17, for example, is achieved by a detachment 18 delimited by the ends of the lengthwise edges 828, 829 forming the food guiding units 16.

The static cutting element 82 of the cutting tool 8 is designed to remain stationary in relation to the magazine 7 of the working attachment 5 while the cutting tool 8 is in use. To this end, the static cutting element 82 advantageously includes, in the vicinity of its inlet opening 820, at least one hooking means 19 formed around or in the extension of the peripheral edge 834 of the inlet opening 820. This hooking means 19 is preferably an elastically deformable and/or snap-in means, in the form of a shoulder, for securing the static cutting element 82 onto the flange 72 of the magazine 7 of the working attachment 5 as the cutting tool 8 is being installed in the working attachment 5 of the electrical appliance 1.

According to a preferred embodiment shown in the figures, the static cutting element 82 forms, on the peripheral edge 834 in the extension of the revolving wall of the hollow body 822 and of the inlet opening 820, a rim 20 designed to cover the open end 810 of the rotary cutting element 81 when the two cutting elements 81, 82 are assembled in the magazine 7 of the working attachment 5, as shown in FIG. 2 in particular. Additionally, this rim 20 likewise includes or advantageously forms the hooking means 19 for the static cutting element 82, this rim 20 being configured for covering the flange 72 of the magazine 7 of the working attachment 5 and enabling, by means of a hook 21 formed on the inner peripheral flange 22 of said rim 20, this hook 21 forming the hooking means 19, the connection, by elastic deformation and snapping, of the rim 20 onto the flange 72 of the magazine and thus the hooking engagement of the static cutting element 82 in a stationary position on the working attachment 5 while also holding the first cutting element 81 in the magazine 7 of said working attachment 5.

More advantageously, in order to simplify the hooking and unhooking of the static cutting element 82 onto the working attachment, the hooking means 19 of the static cutting element 82 includes a lock 23. This lock 23 is advantageously formed by a section 24 of the rim 20 of the second cutting element 82, said section being pivotable in relation to the rest of the rim 18 along an axis X-X' perpendicular to a common lengthwise axis Y-Y' of the cutting elements 81, 82 when the latter are installed in the magazine 7 of the working attachment 5, as shown in FIG. 2. This lock 23 includes a manual closing and opening tab 25 comprising a linking means consisting of a section of the hook-shaped flange 21 of the rim 20.

Lastly, in order to maintain the coaxiality of the two cutting elements 81, 82 of the cutting tool 8 in operation when said elements are assembled in the magazine 7 of the working attachment 5, the static cutting element 82 includes, in its bottom wall 826, a circular aperture 26 on its second end 821 designed for receiving the head 92 of the drive axis 9 for driving the rotary cutting element 81, this head being able to rotate freely in the aperture 26.

The cutting tool 8 of the present invention and by extension the electrical appliance 1 of the invention designed for receiving this cutting tool 8 are especially simple to operate. Initially it suffices to hook the working attachment 5 onto the drive base 2 by its fastening ring 6 and then to install the cutting tool 8 of the invention in the magazine 7 of the working attachment 5.

To do so, one first inserts the rotary cutting element 81 into the housing 71 of the magazine 7 until the male coupling unit 10 of the drive axis 9 engages in the female coupling assembly 815 on the bottom of the second end 811 of the rotary cutting element 81. One then inserts the static cutting element 82 into the rotary cutting element 81 until the head 92 of the drive axis 9 extends through the aperture 26 on the bottom of the static cutting element 82 and the rim 20 is hooked onto the flange 72 of the magazine 7 by its hook 21. To finish, it suffices to lock the assembly by closing the lock 23 on the top part of the flange 72 of the magazine, as shown in FIGS. 2 and 3. The electric appliance 1 and the cutting tool 8 are now ready for use.

When one wants to prepare a dish consisting of diced vegetables such as beets or squash, it suffices to turn on the appliance 1 by pressing the switch 4 for initiating the rotary drive of the rotary cutting element 81 in the magazine 7 of the working attachment. Next, one introduces the foods to be cut into the funnel 14 of the working attachment 5 and one uses the pusher 15 to push them against the rotating blades 814 of the cutting element 81, which first cuts the foods into bars. As a result of the rotation of the rotary cutting element 81, the foods first cut into bars are pressed, simultaneously with the rotation, against the blades 824 of the static cutting element 82, which cuts the bars of food into cubes or dices them. The diced foods then drop by gravity inside the static cutting element 82, into the through-window 827 provided in the wall 822 of the static cutting element 82, in which window the inner surface of the rotary cutting element 81 is circulating in rotation, as shown in FIG. 3. The foods thus diced or cut into cubes are then conveyed by the rotation of the first cutting element into the window 827 and projected against the guiding units 14 on the lengthwise edges 830, 831 of the window 827, which guiding units convey the cut foods towards the discharging assembly 15 in the vicinity of the discharge outlet 820 and the rim 18 of the static cutting element 82. The cut foods can thus be served directly onto a plate or into a serving container.

It should be pointed out that the first cutting means 813 could include only one slicing unit extending away from the revolving wall 812 of the rotary cutting element 81, and the second cutting means 823 would then transform these slices into sticks; alternatively the second cutting means 823 could also be formed by a grid for obtaining cubes.

Once the cutting of the foods is finished, it suffices to stop the electric appliance 1 by once again pressing the switch 4 to stop the motor in the drive base 2 and the rotation of the rotary cutting element 81, then to dismantle the rotary and static cutting elements 81, 82 of the cutting tool 8 and the working attachment 5 in reverse order of their assembly in order to clean them.

The invention claimed is:

1. Static food cutting element configured to be inserted and secured in a stationary position inside of a rotary food cutting element including first food cutting means and arranged in an assembly magazine of a cutting tool of an electric food processing appliance, said static cutting element including a hollow body having an inlet opening in which are arranged second food cutting means, and also a discharge outlet, wherein a through-window is formed in a lower part of the hollow body, and further wherein at least one lengthwise edge of said through-window forms a unit for guiding the cut foods towards the discharge outlet.

2. Static food cutting element as in claim 1, wherein the guiding unit consists of a convex, rounded surface connecting one of the lengthwise edges of said through-window to the inner surface of the hollow body.

3. Static food cutting element as in claim 1, wherein the through-window is arranged at least partially opposite the inlet opening.

4. Static food cutting element as in claim 1, wherein the second cutting means include a set of blades extending longitudinally through the inlet opening towards the discharge outlet.

5. Static food cutting element as in claim 1, wherein it includes, in the vicinity of the discharge outlet, a peripheral edge including an assembly for discharging cut foods in a longitudinal extension of the through-window.

6. Static food cutting element as in claim 5, wherein the peripheral edge forms a rim.

7. Static food cutting element as in claim 1, wherein it includes, in the vicinity of the discharge outlet, a peripheral edge including at least one hooking means.

8. Static food cutting element as in claim 7, wherein the peripheral edge forms a rim and further wherein at least one said hooking means includes a lock formed by a section of the rim, said section being pivotable in relation to the rest of the rim along an axis (X-X') and including a linking means.

9. Static food cutting element as in claim 7, wherein at least one said hooking means is elastically deformable.

10. Static food cutting element as in claim 7, wherein at least one said hooking means is of the snap-in variety.

11. Food cutting tool including:
a) a rotary food cutting element having:
 a first, open end,
 a second end opposite the first, open end and equipped with means for coupling to a rotational drive mechanism, and
 a revolving wall joining the two ends and including first food cutting means;
b) a static food cutting element configured to be inserted and secured in a stationary position inside the rotary food cutting element when the latter is driven in rotation by said drive mechanism,
wherein the static food cutting element is configured according to claim 1.

12. Food cutting tool as in claim 11, wherein the guiding unit of the static food cutting element consists of a surface that is raised in relation to the inner surface of the revolving wall of the rotary food cutting element.

13. Food cutting tool as in claim 11, wherein the first cutting means include at least one slicing unit.

14. Food cutting tool as in claim 13, wherein the first cutting means include at least one set of blades substantially perpendicular to the lines of the revolving wall of the rotary food cutting element.

15. Food cutting tool as in claim 11, wherein the size of the through-window is greater than the size of the foods cut by the first cutting means and the second cutting means.

16. Electric food processing appliance including:
a drive base formed from a housing enclosing an electric drive motor and electric control means for said motor,
a working attachment integrally formed with the drive base and including a magazine for installing a food cutting tool,
a food cutting tool including a rotary food cutting element and a static food cutting element,
means for coupling and for driving, by means of the electric motor, the rotary food cutting element of the food cutting tool in rotation in relation to the static food cutting element of the food cutting tool in the magazine,
wherein the food cutting tool is configured according to claim 11.

17. Electric food processing appliance as in claim 16, wherein the means for coupling and driving in rotation include a drive axis designed to cooperate, by means of a first end, with the electric motor enclosed in the housing of the drive base and bearing, on a second end, a male unit adapted for meshing with a female drive aperture formed in the second end of the rotary food cutting element.

18. Electric food processing appliance as in claim 16, wherein the static food cutting element further comprises, in the vicinity of the discharge outlet, a peripheral edge including at least one hooking means, and wherein the magazine of the working attachment has an open end via which the food cutting tool is inserted into the working attachment, said open end including a circular peripheral flange forming a shoulder for a hooking engagement of the hooking means of the static food cutting element.

* * * * *